US012723558B2

United States Patent
(12) United States Patent
Kawai Tachibana et al.

(10) Patent No.: US 12,723,558 B2
(45) Date of Patent: Sep. 1, 2026

(54) HYDROGEN ENGINE

(71) Applicant: TOYOTA JIDOSHA KABUSHIKI KAISHA, Toyota (JP)

(72) Inventors: Mina Kawai Tachibana, Toyota (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/213,233

(22) Filed: May 20, 2025

(65) Prior Publication Data

US 2026/0092581 A1 Apr. 2, 2026

(30) Foreign Application Priority Data

Oct. 2, 2024 (JP) ................................ 2024-173797

(51) Int. Cl.
*F02M 21/02* (2006.01)

(52) U.S. Cl.
CPC ............................... *F02M 21/0206* (2013.01)

(58) Field of Classification Search
CPC ....................... F02M 21/0206; F02M 21/0275
See application file for complete search history.

(56) References Cited

U.S. PATENT DOCUMENTS

| | | | | |
|---|---|---|---|---|
| 4,181,100 | A * | 1/1980 | Yamane | F02D 19/0644 123/295 |
| 11,415,083 | B1 * | 8/2022 | Kavuri | F02B 41/06 |
| 12,060,824 | B1 * | 8/2024 | Yu | F02M 21/0275 |
| 2004/0221821 | A1 * | 11/2004 | Taxon | F02M 25/12 123/25 A |
| 2007/0272548 | A1 * | 11/2007 | Sutherland | C25B 1/04 205/349 |
| 2011/0174242 | A1 * | 7/2011 | McConahay | F02B 43/08 123/3 |
| 2014/0096728 | A1 * | 4/2014 | Ortenheim | F02B 43/02 123/3 |
| 2024/0125280 | A1 * | 4/2024 | Catalano | F02D 19/022 |
| 2024/0175546 | A1 | 5/2024 | Yamamoto et al. | |

FOREIGN PATENT DOCUMENTS

| | | |
|---|---|---|
| JP | 2002-188547 A | 7/2002 |
| JP | 2024-076203 A | 6/2024 |

* cited by examiner

*Primary Examiner* — George C Jin
(74) *Attorney, Agent, or Firm* — SoraIP, Inc.

(57) ABSTRACT

A hydrogen engine includes: a combustion chamber that combusts an air-fuel mixture of air and a hydrogen gas; an injector that directly injects the hydrogen gas into the combustion chamber; an insertion hole which communicates with the combustion chamber and into which the injector is inserted; and a spacer member disposed in a gap between an inner wall of the insertion hole on a side of the combustion chamber and a tip of the injector in an injection direction of the hydrogen gas, the spacer member containing copper as a main component.

3 Claims, 3 Drawing Sheets

HYDROGEN ENGINE

CROSS-REFERENCE TO RELATED APPLICATION

This application claims priority to Japanese Patent Application No. 2024-173797 filed on Oct. 2, 2024. The disclosure of the above-identified application, including the specification, drawings, and claims, is incorporated by reference herein in its entirety.

BACKGROUND

1. Technical Field

The present disclosure relates to a hydrogen engine.

2. Description of Related Art

Japanese Unexamined Patent Application Publication No. 2024-76203 (JP 2024-76203 A), for example, describes a liquid hydrogen system that supplies hydrogen to a hydrogen engine.

SUMMARY

An in-cylinder direct injection injector injects a hydrogen gas directly into a combustion chamber of a hydrogen engine. The direct injection injector is inserted into an insertion hole provided in a cylinder head of the hydrogen engine. A space called a sack or the like is provided between the tip of the direct injection injector from which the hydrogen gas is injected and the inner wall of the insertion hole on the combustion chamber side so as to suppress wear of a needle of the direct injection injector.

However, the hydrogen gas injected from the tip of the direct injection injector may enter the sack due to a tumble flow in the combustion chamber, and an unburned hydrogen gas at a high temperature may remain in the sack without being discharged after the combustion of the air-fuel mixture in the combustion chamber. In this case, when a new hydrogen gas is injected, the hydrogen gas in the sack may be ignited to cause abnormal combustion such as pre-ignition.

The present disclosure has been made in view of the above issue, and has an object to provide a hydrogen engine capable of suppressing abnormal combustion of a hydrogen gas.

An aspect of the present disclosure provides a hydrogen engine including: a combustion chamber that combusts an air-fuel mixture of air and a hydrogen gas; an injector that directly injects the hydrogen gas into the combustion chamber; an insertion hole which communicates with the combustion chamber and into which the injector is inserted; and a spacer member disposed in a gap between an inner wall of the insertion hole on a side of the combustion chamber and a tip of the injector in an injection direction of the hydrogen gas, the spacer member containing copper as a main component.

In the above hydrogen engine, the spacer member may be fixed to the inner wall by adhesion.

In the above hydrogen engine, the spacer member may have a hole through which the hydrogen gas injected from the injector into the combustion chamber passes.

According to the present disclosure, it is possible to suppress abnormal combustion of a hydrogen gas in a hydrogen engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
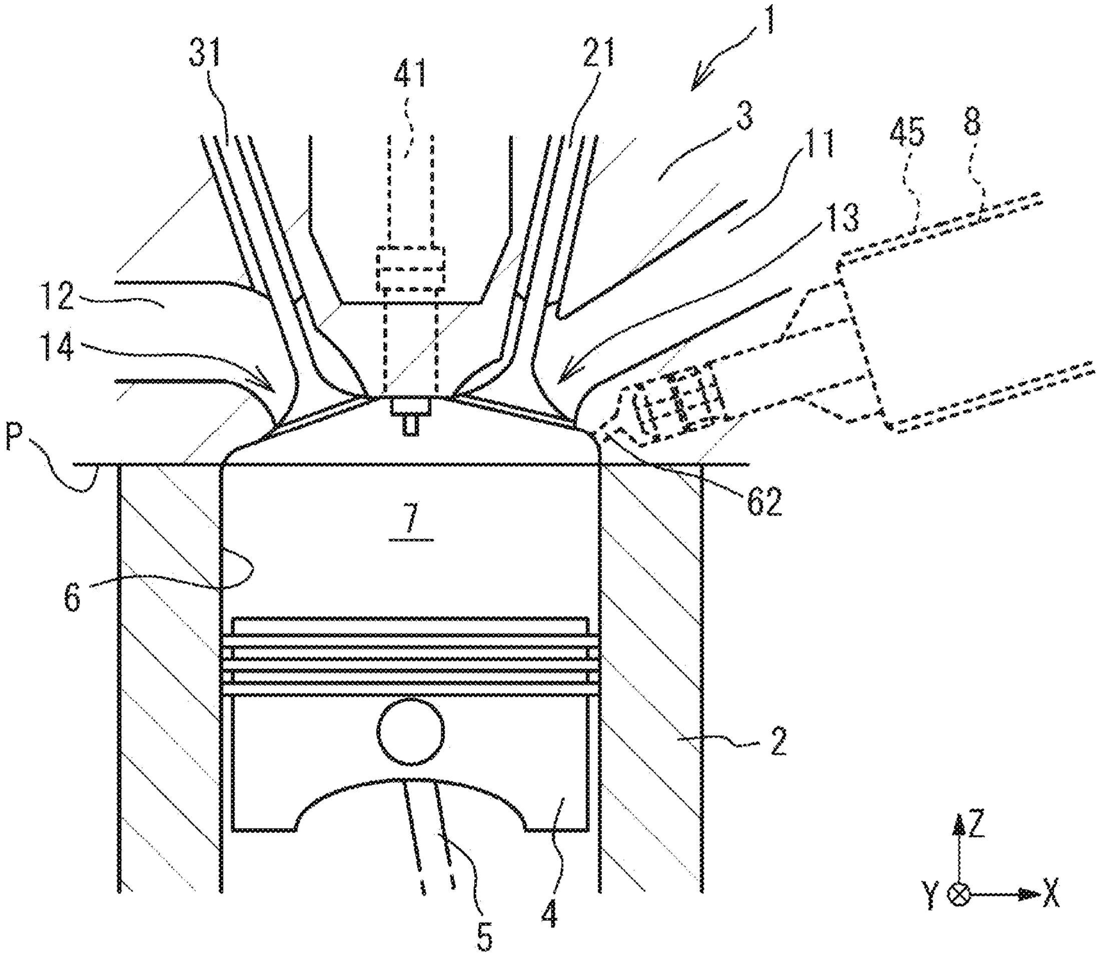
FIG. 1 is a partial cross-sectional view schematically illustrating an example of a hydrogen engine.
Figure 2:
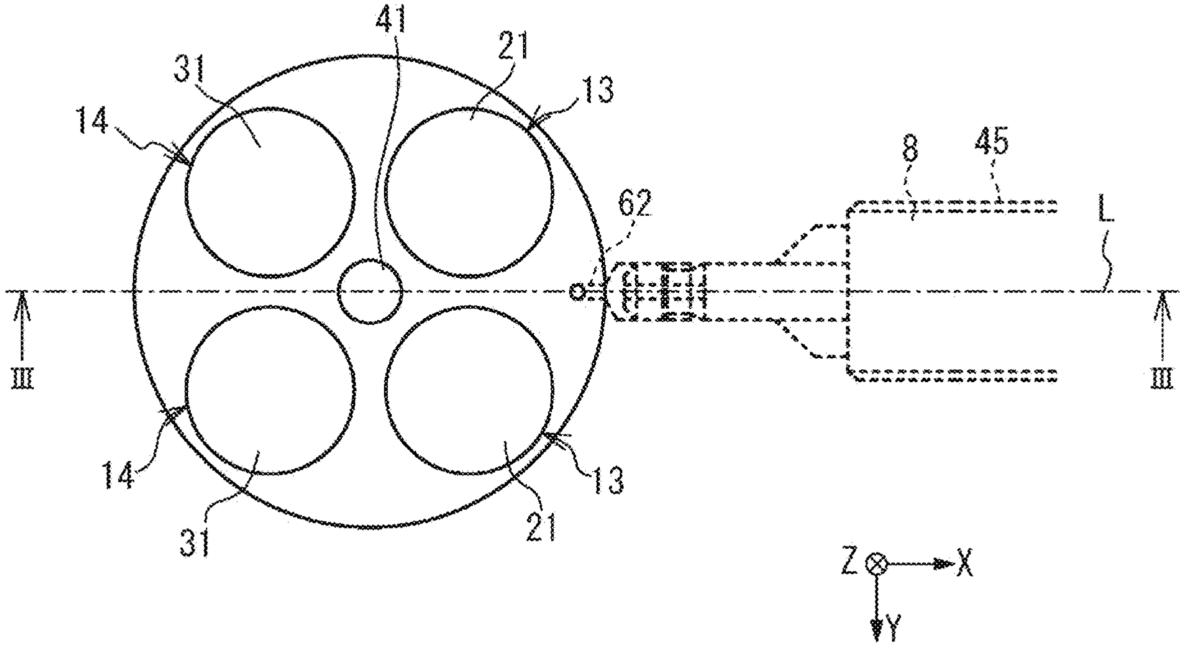
FIG. 2 is a plan view schematically showing a bottom surface of a cylinder head.
Figure 3:
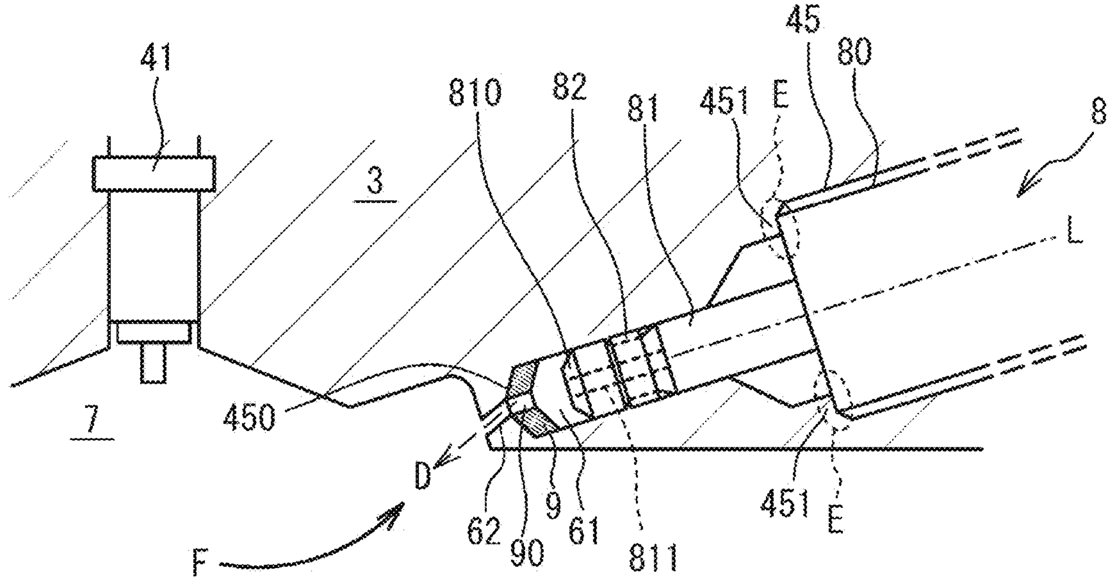
FIG. 3 is a partial cross-sectional view of the cylinder head along III-III of FIG. 2.

FIG. 1 is a partial cross-sectional view schematically illustrating an example of a hydrogen engine 1. The hydrogen engine 1 includes a cylinder block 2, a cylinder head 3, a piston 4, a connecting rod 5, and a direct injection injector 8. The hydrogen engine 1 is mounted as a driving source in a vehicle such as a hydrogen vehicle. In FIG. 1 to FIG. 3, the X direction, the Y direction, and the Z direction orthogonal to each other are illustrated.

The cylinder head 3 is joined to the cylinder block 2 at an interface P along X-Y plane. A cylinder 6 along the Z direction is provided inside the cylinder block 2. The cylinder head 3 is arranged to close one open end of the cylinder 6. The cylinder block 2 and the cylinder head 3 are formed of a metal such as an aluminum alloy or cast iron.

The piston 4 reciprocates in the Z direction in the cylinder 6. The piston 4 is connected to the connecting rod 5 via a piston pin. The connecting rod 5 is connected to a crankshaft (not shown) via a crankpin. The connecting rod 5 serves to convert the reciprocating movement of the piston 4 into a rotational movement of the crankshaft. The wall surface of the cylinder 6 of the cylinder block 2, the cylinder head 3, and the upper surface of the piston 4 define a combustion chamber 7 in which an air-fuel mixture of air and hydrogen gas is combusted.

The cylinder head 3 is provided with an intake port 11 for intake and an exhaust port 12 for exhaust so as to be adjacent to each other in the X direction. The intake port 11 faces the combustion chamber 7 and communicates with the combustion chamber 7 via an intake opening 13 formed in the cylinder head 3. The exhaust port 12 faces the combustion chamber 7 and communicates with the combustion chamber 7 via an exhaust opening 14 formed in the cylinder head 3. Further, the cylinder head 3 is provided with an intake valve 21 for opening and closing the intake opening 13, an exhaust valve 31 for opening and closing the exhaust opening 14, a spark plug 41 for igniting the air-fuel mixture in the combustion chamber 7, and an injector 8 for directly injecting hydrogen gas into the combustion chamber 7.

FIG. 2 is a plan view schematically showing a bottom surface of the cylinder head 3. The combustion chamber 7 is provided with two sets of intake openings 13 and exhaust openings 14. The two intake openings 13 are arranged side by side in the Y direction, and the two exhaust openings 14 are also arranged side by side in the Y direction. The spark plug 41 is arranged along the Z direction and is located substantially at the center of the two intake openings 13 and the two exhaust openings 14. The injector 8 is inserted into the insertion hole 45 in the cylinder head 3, and injects hydrogen gas into the combustion chamber 7 through the injection hole 62 opened in the combustion chamber 7. The injector 8 is arranged such that its axis L passes along the X-direction between the two intake openings 13 in the Y-direction and between the two exhaust openings 14.

FIG. 3 is a partial cross-sectional view of the cylinder head 3 along III-III of FIG. 2. The injector 8 is inserted into an insertion hole 45 in the cylinder head 3. The insertion hole 45 extends toward substantially the center of the combustion chamber 7 and is formed in accordance with the shape of the injector 8. The insertion hole 45 communicates with the combustion chamber 7 through the injection hole 62.

The injector 8 has a substantially cylindrical main body portion 80, an extending portion 81 extending from the main body portion 80, and a distal end portion 810 provided at the distal end of the extending portion 81. The extending portion 81 has a substantially columnar shape having a diameter smaller than that of the main body portion 80 and a constricted portion, and a substantially band-shaped seal member 82 is wound around the constricted portion. The seal member 82 is formed of, for example, Teflon (registered trademark), and seals a gap between the seal member and the inner wall of the insertion hole 45. This maintains the airtightness of the combustion chamber 7. Note that if the airtightness of the combustion chamber 7 is maintained, the seal member 82 is not necessarily provided.

The distal end portion 810 has a tapered annular shape facing the injection direction of the hydrogen gas, and faces the inner wall 450 on the side of the combustion chamber 7 adjacent to the edge of the opening of the injection hole 62 in the insertion hole 45. A gap 61 called a sack or the like is formed between the distal end portion 810 and the inner wall 450. Inside the distal end portion 810 and the extending portion 81, a delivery hole 811 through which hydrogen gas is delivered is provided along the axis L direction. Hydrogen gas enters the gap 61 from the delivery hole 811 and is injected into the combustion chamber 7 through the injection hole 62 as indicated by an arrow D. The direction in which the injection hole 62 extends is inclined by a predetermined angle with respect to the axis L of the injector 8 so that the hydrogen gas is injected in an appropriate direction inside the combustion chamber 7.

The distal end portion 810 of the injector 8 is separated from the combustion chamber 7 by a gap 61 between it and the inner wall 450 of the insertion hole 45. As a result, the temperature rise of the needle (not shown) or the like of the injector 8 is suppressed as compared with the case where the gap 61 is not present.

As indicated by reference numeral E, the insertion hole 45 has a stepped portion 451 formed so as to be in contact with the front end side surface of the main body portion 80. When the main body portion 80 and the stepped portion 451 come into contact with each other, the injector 8 is positioned with respect to the insertion hole 45.

A spacer member 9 containing copper as a main component is provided in the gap 61 between the inner wall 450 and the distal end portion 810 of the insertion hole 45. In FIG. 3, the spacer member 9 is shown as a cross-section along X-Z plane. The spacer member 9 promotes combustion of hydrogen gas and air (oxygen) entering the gap 61 by the tumble flow F generated in the combustion chamber 7. At this time, copper, which is a material of the spacer member 9, acts as a catalyst for the combustion reaction of hydrogen gas and oxygen. Note that the spacer member 9 may be formed of only copper, or may be an alloy of copper and another metal.

Figure 4:
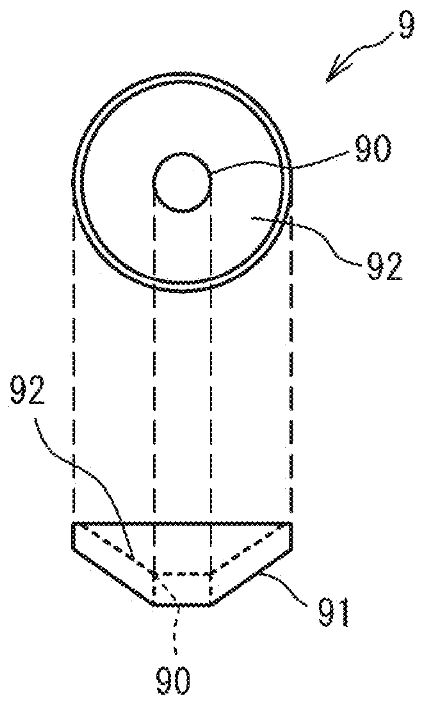
FIG. 4 is a diagram illustrating an example of a spacer member in a plan view and a side view.

FIG. 4 is a diagram illustrating an example of the spacer member 9 in a plan view and a side view. The spacer member 9 has a substantially annular shape whose diameter decreases toward the injection direction of the hydrogen gas. A center hole 90 is provided in the center of the spacer member 9 in plan view. Since the spacer member 9 is arranged such that the position of the center hole 90 coincides with the position of the injection hole 62, the hydrogen gas is injected from the injector 8 through the center hole 90 into the combustion chamber 7 as indicated by the arrow D in FIG. 3. The center hole 90 is an example of a hole. Further, the spacer member 9 may have another shape that does not have the center hole 90.

The lower surface 91 of the spacer member 9 faces the opening of the injection hole 62 and is inclined from the outer peripheral edge toward the center hole 90 so as to be convex toward the combustion chamber 7 side. The upper surface 92 of the spacer member 9 faces the distal end portion 810 of the injector 8 and is inclined from the outer peripheral edge toward the center hole 90 so as to be recessed toward the distal end portion 810. Therefore, the hydrogen gas injected from the injector 8 is delivered to the combustion chamber 7 more smoothly than when the upper surface 92 and the lower surface 91 are substantially flat. The upper surface 92 and the lower surface 91 may be substantially flat.

The spacer member 9 is fixed by being adhered to the inner wall 450 of the insertion hole 45 by an adhesive. As a result, displacement of the spacer member 9 due to vibration of the hydrogen engine 1 is suppressed. Note that the spacer member 9 is not limited to the fixing by adhesion, but may be fixed by being fitted into a groove formed in the insertion hole 45, for example, but in this case, the shape of the spacer member 9 and the insertion hole 45 is complicated, and it is also difficult to assemble the spacer member 9. Further, the spacer member 9 can be fixed by sandwiching the distal end portion 810 of the injector 8 in contact with a part of the upper surface 92 of the spacer member 9 and sandwiching it between the inner wall 450. However, in this case, the vibration of the hydrogen engine 1 propagates to the injector 8, which is not preferable.

Copper, which is a material of the spacer member 9, acts as a catalyst for burning hydrogen gas and air (oxygen) in the gap 61. As a result, the oxidation reaction of the high-temperature hydrogen gas in the gap 61 is accelerated to generate moisture. Therefore, the hydrogen gas in the gap 61 is reduced after the combustion in the combustion chamber 7 as compared with the case where the spacer member 9 is not present.

The above-described embodiments are preferred embodiments of the present disclosure. However, the present disclosure is not limited thereto, and various modifications can be made without departing from the gist of the present disclosure.

What is claimed is:

1. A hydrogen engine comprising:

a combustion chamber that combusts an air-fuel mixture of air and a hydrogen gas;

an injector that directly injects the hydrogen gas into the combustion chamber;

an insertion hole which communicates with the combustion chamber and into which the injector is inserted; and a spacer member disposed in a gap between an inner wall of the insertion hole on a side of the combustion chamber and a tip of the injector in an injection direction of the hydrogen gas, the spacer member containing copper as a main component.

2. The hydrogen engine according to claim 1, wherein the spacer member is fixed to the inner wall by adhesion.

3. The hydrogen engine according to claim 1, wherein the spacer member has a hole through which the hydrogen gas injected from the injector into the combustion chamber passes.

* * * * *